(12) United States Patent
Banker et al.

(10) Patent No.: US 9,127,626 B2
(45) Date of Patent: Sep. 8, 2015

(54) METHODS AND SYSTEMS FOR TURBOCHARGER CONTROL

(71) Applicant: Ford Global Technologies, LLC, Dearborn, MI (US)

(72) Inventors: Adam Nathan Banker, Plymouth, MI (US); Joseph Norman Ulrey, Dearborn, MI (US); Laura Brzozowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 13/869,754

(22) Filed: Apr. 24, 2013

(65) Prior Publication Data

US 2014/0318508 A1 Oct. 30, 2014

(51) Int. Cl.
| | |
|---|---|
| *F02M 31/00* | (2006.01) |
| *F02D 41/06* | (2006.01) |
| *F02M 31/04* | (2006.01) |
| *F02D 41/00* | (2006.01) |
| *F02B 29/04* | (2006.01) |
| *F02B 37/16* | (2006.01) |
| *F02B 39/16* | (2006.01) |

(52) U.S. Cl.
CPC .............. *F02M 31/042* (2013.01); *F02B 29/04* (2013.01); *F02B 37/16* (2013.01); *F02B 39/16* (2013.01); *F02D 41/0007* (2013.01); *F02D 41/064* (2013.01); *Y02T 10/144* (2013.01); *Y02T 10/146* (2013.01)

(58) Field of Classification Search
CPC ..... F02M 31/00; F02M 31/042; F02M 31/06; F02M 31/04; F01N 5/02; F28F 27/00; F02D 41/06; F02D 41/064; F02D 41/0007; F02D 2200/0404

USPC .................................... 123/556, 543; 701/113
See application file for complete search history.

(56) References Cited

U.S. PATENT DOCUMENTS

| | | | | |
|---|---|---|---|---|
| 5,740,786 | A * | 4/1998 | Gartner | 123/568.12 |
| 6,167,703 | B1 * | 1/2001 | Rumez et al. | 60/599 |
| 6,334,436 | B1 * | 1/2002 | Paffrath et al. | 123/563 |
| 7,010,914 | B1 | 3/2006 | Roberts, Jr. et al. | |
| 7,017,531 | B2 | 3/2006 | Wooldridge et al. | |
| 7,607,318 | B2 * | 10/2009 | Lui et al. | 62/402 |
| 8,042,335 | B2 * | 10/2011 | Pursifull et al. | 60/602 |
| 8,413,438 | B2 * | 4/2013 | Pursifull et al. | 60/602 |
| 8,516,816 | B2 * | 8/2013 | Pursifull et al. | 60/605.2 |
| 8,628,025 | B2 * | 1/2014 | Bucknell | 237/12.3 R |
| 8,793,986 | B2 * | 8/2014 | Caine | 60/320 |
| 2004/0177837 | A1 * | 9/2004 | Bryant | 123/559.1 |
| 2006/0064981 | A1 * | 3/2006 | Kojima et al. | 60/612 |
| 2009/0049832 | A1 | 2/2009 | Hase | |
| 2012/0216767 | A1 * | 8/2012 | Ulrey et al. | 123/142.5 R |

FOREIGN PATENT DOCUMENTS

GB 2483271 A * 7/2012 ............. F02B 29/04

* cited by examiner

*Primary Examiner* — Lindsay Low
*Assistant Examiner* — Grant Moubry
(74) *Attorney, Agent, or Firm* — Julia Voutyras; Alleman Hall McCoy Russell & Tuttle LLP

(57) ABSTRACT

Methods are provided for controlling a turbocharged engine having an additional throttle located between an intake manifold of the engine and an outlet of a compressor. In one example approach a method comprises, during a cold start condition, diverting a portion of compressed air from downstream a compressor to a heat exchanger, and heating vehicle components with the heat exchanger.

11 Claims, 4 Drawing Sheets

METHODS AND SYSTEMS FOR TURBOCHARGER CONTROL

BACKGROUND AND SUMMARY

Engines may include turbochargers and may use active control of the turbocharger, such as via a wastegate, intake throttle, a compressor bypass, etc., to increase efficiency of engine performance and thus vehicle driveability. In some vehicle applications, excess heat from the engine, e.g., in the form of hot air, may be used to heat various vehicle components, e.g., to heat the cabin of the vehicle, assist in throttle de-icing, and provide heat to humidity management systems, deliver heat to a window defroster, assist in accelerated engine warm-up, and provide heat to other vehicle and engine components.

However, during cold engine conditions when a temperature of the engine is less than a threshold temperature, e.g., during cold start conditions before the engine is sufficiently warmed up, excess engine heat may not be available to provide heated air to vehicle and engine components. In some approaches, heating elements, e.g., electric heaters, may be employed to assist in providing heat while the engine warms up. However, such approaches may reduce engine efficiency, e.g., may reduce fuel economy, since such heating elements consume additional energy during operation.

Further, during certain boosted engine operating conditions, pressure/flow in a turbocharger system may cause the turbocharger to surge potentially degrading turbocharger components and reducing vehicle performance. For example, a compressor may surge due to low air flow conditions with high pressure, e.g., when an intake throttle is closed or partially open. For example, such a surge event may occur after a driver tip-out event where a reduced amount of boost is requested for engine operation.

The inventors herein have recognized the above-described issues and, in one example approach, a method for a vehicle with a turbocharged engine is provided. The method comprises during a cold start condition, e.g., when an engine temperature is less than a threshold temperature or within a threshold of ambient temperature, diverting a portion of compressed air from downstream a compressor to a heat exchanger, and heating vehicle components via the heat exchanger. The method may further comprise, in response to a surge condition when the engine temperature is greater than the threshold temperature, diverting a portion of compressed air from downstream the compressor to the heat exchanger.

For example, an additional throttle and take-off conduit may be included between an intake manifold and a compressor in a turbocharged engine so that high pressure heated air can be delivered to a heat exchanger to provide heat to heat consuming vehicle and engine components, even during cold engine conditions. Further, such an additional throttle may be used to divert a portion of compressed air away from the intake manifold of the engine so that the compressor can flow additional air without the air being inducted by the engine in order to reduce surge.

In this way, heated air may be provided to various engine and vehicle components even during cold start conditions, e.g., while the engine temperature is less than a threshold engine temperature, without relying on an additional heating elements, e.g., electric heaters, which consume additional energy. In this way, engine efficiency may be increased while providing a faster source of excess heat during cold conditions. Further, this additional throttle may be used to provide greater control over turbocharger operation, e.g., to reduce surge events and to meet boost requests during engine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
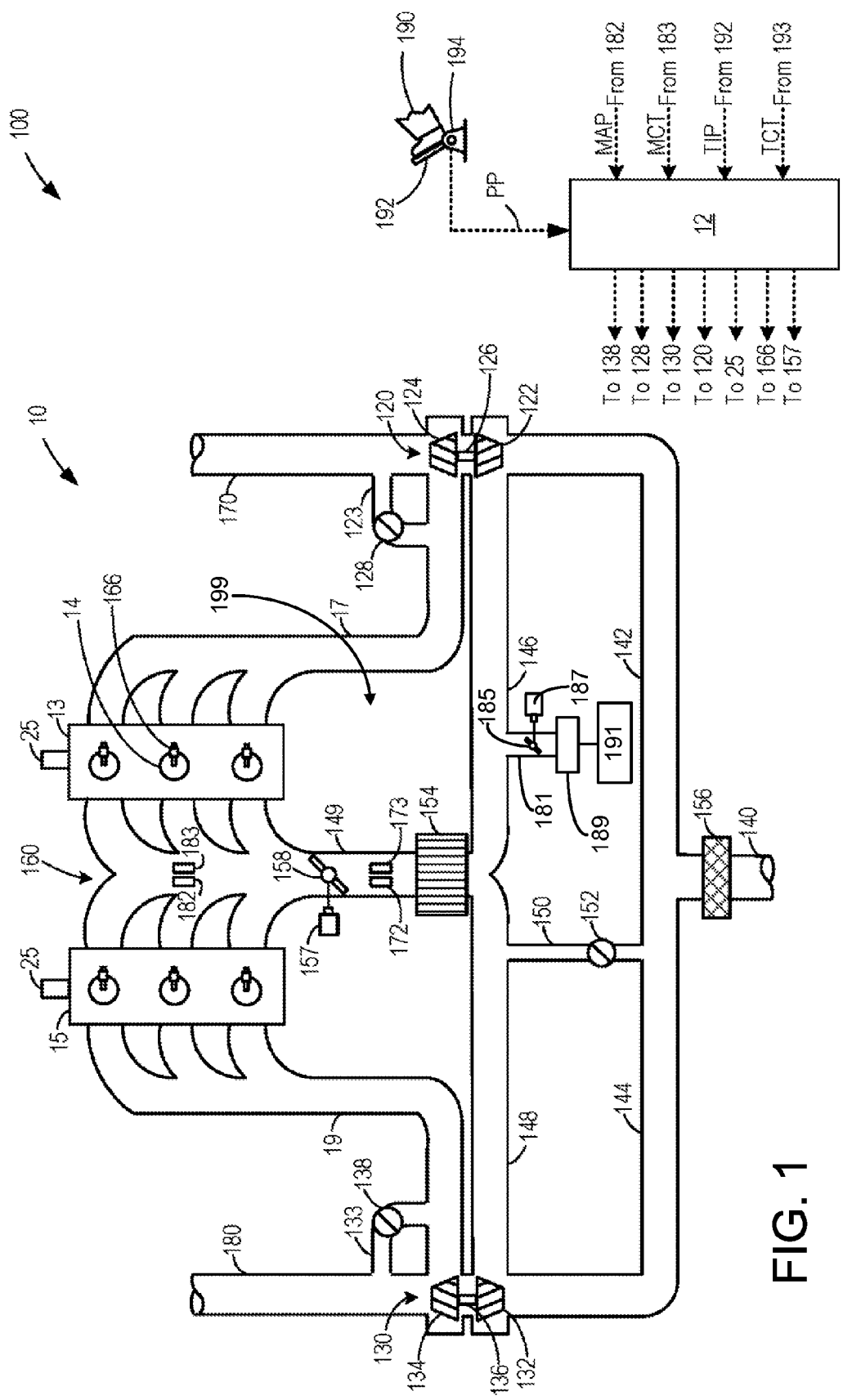
FIG. 1 shows a schematic depiction of an example engine system including a turbocharger system.
Figure 2:
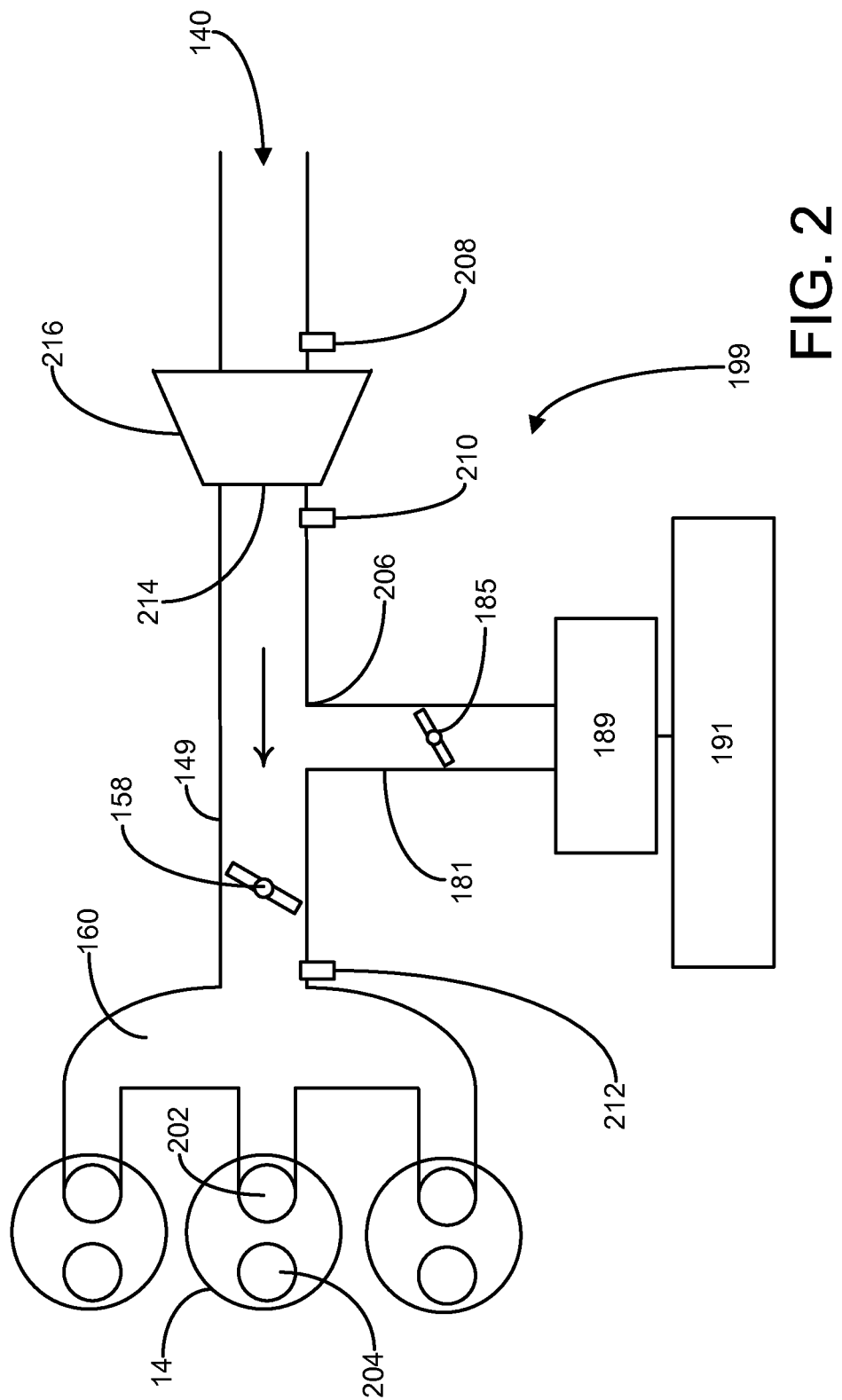
FIG. 2 shows a schematic depiction of an example engine system including an additional throttle in an intake of the engine downstream of a compressor outlet.

The following description relates to systems and methods for controlling a turbocharged engine with an additional throttle located in a conduit between an outlet of a compressor and an intake valve of a cylinder of the engine, such as depicted in FIGS. 1-2. As described with regard to FIGS. 3 and 4, this additional throttle may be used in conjunction with an intake throttle and other valves in a turbocharger system, e.g., a wastegate valve and an anti-surge valve, to provide heat to various components during cold engine conditions and to provide an increased amount of control to turbocharger operation during different engine operating conditions. For example, during cold engine conditions, e.g., following a cold start from rest, the additional throttle may be opened in order to direct heated compressed air to one or more heat exchangers in order to heat various vehicle and engine components while the engine is warming up. As another, example, this additional throttle may be actuated during certain conditions in order to assist in reducing surge events in the turbocharger system.

FIG. 1 shows a schematic depiction of an example turbocharged engine system 100 including a multi-cylinder internal combustion engine 10 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air can be directed to a compressor 122 of turbocharger 120 via a first branch of the intake passage 140 as indicated at 142 and at least a portion of the intake air can be directed to a compressor 132 of turbocharger 130 via a second branch of the intake passage 140 as indicated at 144.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. Intake passage 149 can include an air cooler 154 and/or a throttle 158. The position of the throttle can be adjusted by the control system via a throttle actuator 157 communicatively coupled to controller 12. In some examples, Intake passage 149 may include a pressure sensor 172 for estimating a pressure upstream of intake throttle 158 and/or a temperature sensor 173 for estimating air temperature (MCT), each communicating with controller 12. As shown in FIG. 1, an anti-surge valve 152 may be provided to selectively bypass the compressor stages of turbochargers 120 and 130 via bypass passage 150. As one example, anti-surge valve 152 can open to enable flow through bypass passage 150 when the intake air pressure upstream of the compressors attains a threshold value.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted from via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

Products of combustion that are exhausted by engine 10 via exhaust passages 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via a solenoid valve. In this particular example, the solenoid valve may receive a pressure difference for facilitating the actuation of wastegate 128 via the actuator from the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system.

Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve. In this particular example, the solenoid valve may receive a pressure difference for facilitating the actuation of wastegate 138 via the actuator from the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 170 while combustion products exhausted via exhaust passage 19 may be directed to the atmosphere via exhaust passage 180. Exhaust passages 170 and 180 may include one or more exhaust after-treatment devices, such as a catalyst, and one or more exhaust gas sensors.

The position of intake and exhaust valves of each cylinder 14 may be regulated via hydraulically actuated lifters coupled to valve pushrods, or via a cam profile switching mechanism in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

In order to provide heat to engine and vehicle components during cold engine conditions and to increase control over turbocharger operation during engine operation, an additional or second throttle 185 is included in a conduit 181 located between intake valves in one or more cylinders of the engine and an outlet of a compressor. The position of the throttle can be adjusted by the control system via a throttle actuator 187 communicatively coupled to controller 12. Conduit 181 is located between an outlet of a compressor, e.g., compressor 132 and/or compressor 122, and an intake valve in a cylinder of the engine. For example, conduit 181 may be coupled to intake passage 149 at a position upstream of intake throttle 158 and downstream of air cooler 172. However, in other examples, conduit 181 may be coupled to conduit 148 downstream of an outlet of compressor 132 or coupled to conduit 146 downstream of an outlet of compressor 122 or in any other suitable location to divert a portion of compressed air away from one or more intake valves in the engine. By way of example, FIG. 1 shows conduit 181 coupled to conduit 146 downstream of the outlets of compressors 122 and 132 and upstream of intercooler 154.

Conduit 181 is configured to direct or divert heated compressed air output by a compressor, e.g., compressor 132 and/or compressor 122, to one or more heat exchangers, e.g., heat exchanger 189. For example, heat exchanger 189 may be fluidically coupled to conduit 181 at a position downstream of second throttle 181. The heated air received at the heat exchanger 189 may be used to provide heat to one or more engine or vehicle components 191, e.g., to heat the cabin of the vehicle, assist in throttle de-icing, provide heat to humidity management systems, deliver heat to a window defroster, assist in accelerated engine warm-up, and provide heat to other vehicle and engine components. The cabin of the vehicle may be an interior space in which vehicle seats are positioned for passengers and/or the vehicle driver/operator. The heat exchanger may exchange heat with air in ducts of the HVAC system of the passenger compartment, upstream and/or downstream of a heater core (the heater core coupled in the engine coolant loop). Further the heat exchanger may exchange heat with engine coolant systems via the engine coolant loop upstream of the heater core, and/or with other fluids.

Engine system 100 can include various other sensors. For example, each of intake passages 142 and 144 can include a mass air flow sensor (not shown). In some examples, only one of intake passages 142 and 144 can include a mass air flow (MAF) sensor. In some examples, intake manifold 160 may include an intake manifold pressure (MAP) sensor 182 and/or an intake manifold temperature sensor 183, each communicating with controller 12. In some examples, common intake passage 149 may include a throttle inlet pressure (TIP) sensor 192 for estimating a throttle inlet pressure (TIP) and/or a throttle inlet temperature sensor 193 for estimating a throttle air temperature (TCT), each communicating with controller 12.

Engine 10 may receive control parameters from controller 12 and input from a vehicle operator 190 via an input device 192. In this example, input device 192 includes an accelerator pedal and a pedal position sensor 194 for generating a proportional pedal position signal PP. As further elaborated in FIGS. 4-6, in response to the input received from the vehicle operator, controller 12 can be configured to adjust the amount of boost provided by turbochargers 120 and 130, and thereby adjust TIP. In one example, controller 12 may achieve this by varying the position of throttle 158 by adjusting throttle actuator 157. In another example, controller 12 may achieve this by adjusting wastegates 128 and 138, to thereby adjust an amount of exhaust that bypasses turbines 124 and 134. In other example, controller 12 may achieve this by adjusting the vane position and/or nozzle position of a variable geometry turbine.

It should be understood that though FIG. 1 shows an example engine system including a twin turbocharger configuration, in other examples any number of turbochargers and any turbocharger configuration may be used. For example, the engine system may include a single turbocharger with a single compressor and turbine.

FIG. 2 shows another schematic depiction of an example engine system including an additional or second throttle in an intake of the engine downstream of a compressor outlet. Like numbers shown in FIG. 2 correspond to like elements shown in FIG. 1 described above. As shown in FIG. 2, the additional or second throttle 185 is disposed in conduit 181 which is coupled to intake passage 149 downstream of an outlet 214 of a compressor 216 and upstream of an intake valve 202 of a cylinder 14 of the engine. As described above, the engine may include any suitable number of cylinders in any suitable configuration where each cylinder includes an intake valve and an exhaust valve. For example, as shown in FIG. 2, cylinder 14 include intake valve 202 and exhaust valve 204 and conduit 181 is located upstream of at least one intake valve of a cylinder in the engine. In some examples, conduit 181 may be located upstream of intake manifold 160 so that the conduit is located upstream of all intake valves in all cylinders of the engine. Further, in some examples, as shown in FIG. 2, conduit 181 may be located upstream of the main or first intake throttle 158.

Conduit 181 may be coupled to intake passage 149 at a junction 206 so that during boosted engine operation when second throttle 185 is actuated or at least partially opened, at least a portion of compressed air output by compressor 216 via outlet 214 is directed away from intake throttle 158 into conduit 185 towards one or more heat exchangers, e.g., heat exchanger 189. Even during cold engine conditions, e.g., when the temperature of the engine is less than a threshold temperature, compressed air output by compressor 122 may be at least partially heated to that, when this heated compressed air is directed to heat exchanger 189, the heat exchanger can supply heat to one or more vehicle or engine components 191.

As remarked above, various sensor systems may be included in the engine system, each communicating with controller 12. For example, FIG. 2 shows a sensor system 212 located in intake passage 149 downstream of intake throttle 158, a sensor system 210 located downstream of compressor outlet 210 and a sensor system 208 located upstream of compressor 216. Sensor systems 212, 210, and 208 may include pressure sensors, air flow sensors, temperature sensors, etc., and may be used to determine engine operating parameters and engine and turbocharger operating conditions may be adjusted in response to these determined parameters. For example, as described in more detail below with regard to FIGS. 3 and 4, in response to changes in engine and/or turbocharger operating conditions, one or more of the intake throttle 158, the second throttle 185, a wastegate valve (e.g., wastegate 128 and/or wastegate 138), and anti-surge valve 152 may be actuated and adjusted.

Figure 3:
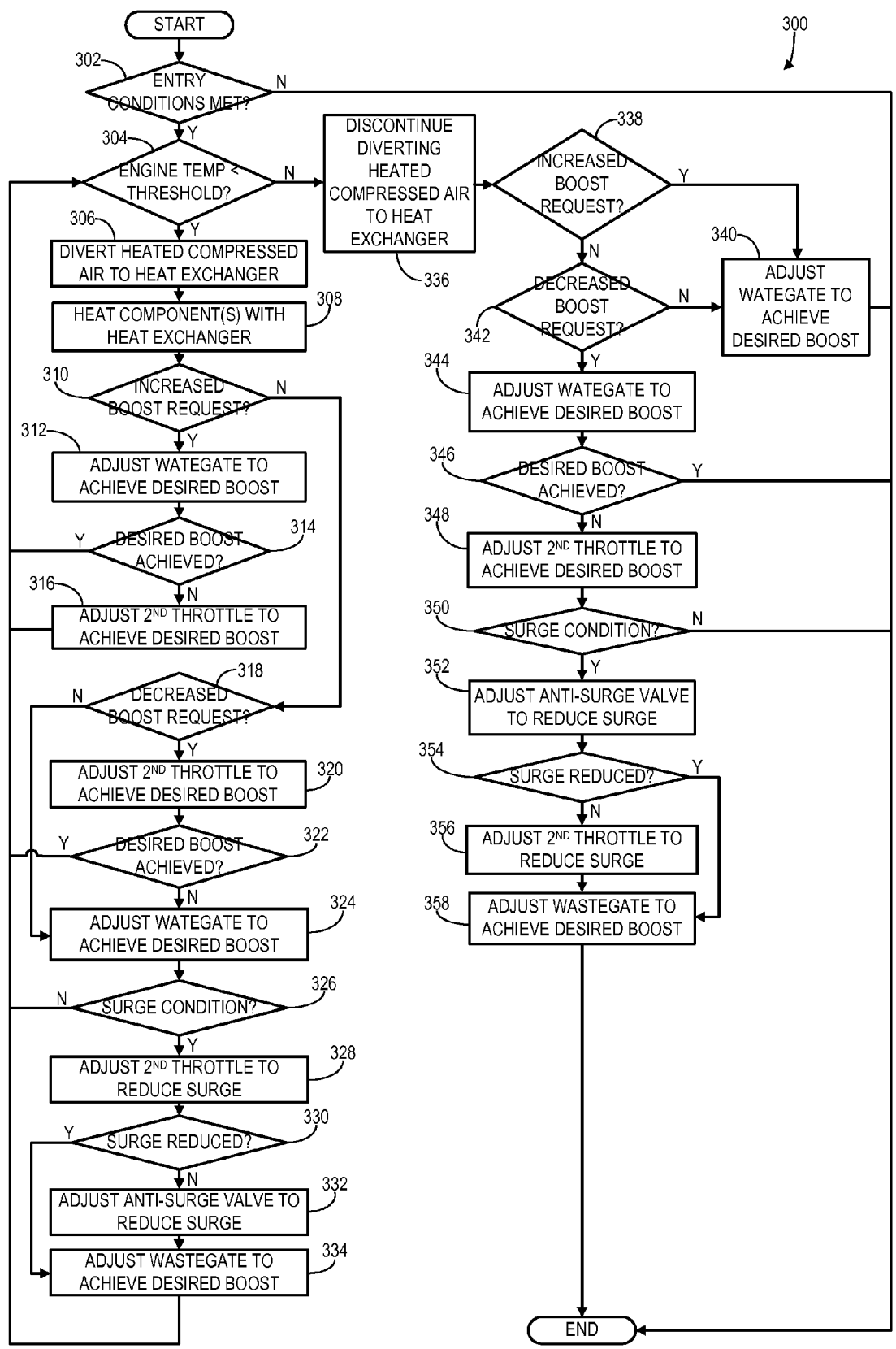
FIG. 3 shows an example method for an engine with a turbocharger in accordance with the disclosure.

FIG. 3 shows an example method 300 for a turbocharged engine including an additional or second throttle, e.g., second throttle 185, located in a conduit coupled between an outlet of a compressor and a cylinder intake valve in the engine. For example, the turbocharged engine may include a first throttle, e.g., intake throttle 158, positioned in an intake of the engine downstream of an outlet of the compressor and the second throttle, which is different from the first throttle, may be used during select conditions to divert a portion of compressed air from downstream the compressor to a heat exchanger. The diverting may lead air away from the engine intake so that it does not enter the engine cylinders, where the air exiting the heat exchanger does not enter the engine cylinders, but rather is led to heat other fluids. Further, in some examples there may be no heat exchanger, and rather the heated air may be used directly to heat components, such as a windshield, or another component in the engine compartment. In this way, compressed air may be diverted away from induction by the engine to heat various engine and vehicle components and/or to increase control over boosted engine operation.

At 302, method 300 includes determining if entry conditions are met. Entry conditions may include an engine start request, e.g., a key-on event to start the engine from rest. Further, entry conditions may include determining if the engine is configured to operate with boost. If entry conditions are met at 304, method 300 proceeds to 304.

At 304, method 300 includes determining if an engine temperature is less than a threshold temperature. For example, one or more temperature sensors in the engine system may be used to determine a temperature of the engine. For example, one or more sensors in an exhaust system of the engine may be used to determine a temperature of the engine. As another example, one or more sensors positioned downstream of an outlet of a compressor in the engine may be used to determine a temperature of the engine. This temperature of the engine may be used to determine if cold start conditions are present. The threshold temperature may be based on the amount of heat consumed by the various engine and vehicle components and thus may be based on an amount of excess heat from the engine used to sufficiently heat these components.

For example, after starting an engine from rest, the engine may not be sufficiently warmed up to provide excess heat to various engine and vehicle components while the engine warms up after the cold start, for example when an operator requests heat via the vehicles HVAC system. Thus, if engine temperature is less than the threshold temperature at 304, method 300 proceeds to 306 to divert heated compressed air to a heat exchanger. For example, second throttle 185 may be actuated to an at least partially open position in order to divert some of the heated compressed air output by a compressor, e.g., compressor 216, away from an intake manifold of the engine and into conduit 181.

This heated compressed air may then be used to assist in heating various engine and vehicle components during the cold engine operating conditions. Thus, at 308, method 300 includes heating component(s) with the heat exchanger. For example, the hot compressed air directed through conduit 181 may be delivered to one or more heat exchangers, e.g., heat exchanger 189, which are thermally coupled to heat consuming engine and vehicle components.

At 310, method 300 includes determining if an increased boost request occurs while the engine temperature is less than the threshold temperature. For example, an increased boost request may occur in response to an increased engine load and/or in response to a driver tip-in where the driver presses an accelerator pedal to request an increased amount of torque.

If an increased boost request occurs at 310, method 300 proceeds to 312 to adjust a wastegate valve to achieve a desired boost. For example, one or more of wastegate valves 128 and 138 may be actuated to meet the increased boost request. For example, an opening of a wastegate valve may be decreased in order to increase an amount of boosted air provided to the engine while the second throttle is maintained in a fixed open position.

During boost control while the engine temperature is less than the threshold temperature, adjustment of valves for engine control may be chosen so at to maintain the second throttle in an open position so that heated compressed air is diverted to heat the heat consuming engine and vehicle components during engine warm-up. For example, initially the second throttle may be opened to a fully open position and wastegate adjustments may be made to adjust boost. However, if the wastegate is adjusted to a fully closed position in order to increase boost but the increased boost request is still not met, then adjustments may be made to the position of the second throttle. For example, the second throttle may be adjusted from a fully-open position to a partially open position to meet the boost request.

Thus at 314, method 300 includes determining if the desired boost is achieved by adjusting the wastegate valve. If the desired boost is achieved at 312, then method 300 proceeds back to 304 to determine if engine temperature is still below the threshold temperature. However, if the desired boost is not achieved at 314, method 300 proceeds to 316 to adjust the second throttle to achieve the desired boost. For example, second throttle 185 may be adjusted from an initial open position to a second open position where in the initial open position the amount of opening of the second throttle is greater than the amount of opening of the second throttle in the second open position. Once the boost increase request is met by these adjustments, method 300 may then return to 304 to determine if engine temperature is still less than the temperature threshold.

Returning to 310, if an increased boost request does not occur, then method 300 proceeds to 318 to determine if a decreased boost request occurs. For example, a decreased boost request may occur in response to a decrease in engine load and/or in response to a driver tip-out where the driver disengages an accelerator pedal to request a decreased amount of torque. If a decreased boost request does not occur at 318, method 300 proceeds to 324 to adjust the wastegate valve to achieve the desired boost. For example, while maintaining the second throttle in a fixed open position, one or more wastegate valves in the engine system may be adjusted to adjust the amount of boost supplied to the engine.

However, if a decreased boost request occurs at 318, then method 300 proceeds to 320 to adjust the second throttle to achieve the desired boost. For example, if the second throttle 185 is in a partially opened position then the amount of opening of the second throttle may be increased in order to reduce the amount of boosted air provided to the engine. In this way, an increased amount of heated air may be diverted to heat the engine and vehicle components while the engine is still warming up. However, if the second throttle is adjusted to a fully open position and the decreased boost request is still not met, then adjustment of one or more wastegate valves may be used to further reduce the boost provided to the engine to the meet the decreased boost request.

Thus, At 322, method 300 determines if the desired boost is achieved via the second throttle adjustment. If the desired boost is achieved at 322, method 300 returns to 305 to determine if the engine temperature is still less than the threshold temperature. However, if the desired boost is not achieved at 322, then method 300 proceeds to 324 to adjust the wastegate to achieve the desired boost. For example, an opening amount of one or more wastegate valves in the engine system may be increased in order to decrease the amount of boost provided to the engine to meet the decreased boost request.

In some examples, engine and turbocharger operating conditions may lead to a surge event in a turbocharger which may degrade turbocharger components and engine operation. For example, during high-pressure and low-flow conditions, a compressor may surge. For example, these surge conditions may occur following a driver-tip out when an opening of the intake throttle 158 is decreased while boost pressure remains high. Thus, at 326, method 300 includes determining if a surge condition is present. For example, determining if a surge condition is present may be based on one or more of pressure readings, temperature readings, and air flow readings from various sensor systems in the engine system, e.g., sensor systems 212, 210, and 208. For example, if boost pressure is determined to be above a pressure threshold and an amount of flow of boosted air in intake passage 149 is determined to be below an air flow threshold then a surge condition may be identified. As another example, identification of a surge condition may be based on a position of intake throttle 185 together with an amount of boost air output by a compressor. For example, if the amount of boosted air is greater than a threshold and if an amount of opening of the intake throttle 158 is less than a threshold amount then a surge condition may be identified.

If a surge condition is not present at 326, method 300 returns to 304 to determine if engine temperature is still below the threshold temperature. However, if a surge condition occurs at 326, method 300 proceeds to 328 to adjust the second throttle to reduce surge conditions. For example, an amount of opening of second throttle 185 may be increased in order to divert an increased portion of the boosted air into conduit 181 for delivery to heat exchanger 189. However, if the second throttle is in a fully open position and surge conditions are still present then an anti-surge valve located in a conduit between a compressor outlet and a compressor inlet, e.g., valve 152, may be adjusted in order to further reduce the amount of boosted air in intake passage 149. Thus, at 330, method 300 includes determining if surge conditions are reduced via the second throttle adjustment. If surge conditions are reduced at 330 then method proceeds to 334 to adjust the wastegate to achieve the desired boost. However, if surge conditions are not reduced at 330, at 332, method 300 includes adjusting an anti-surge valve to reduce surge. For example, an opening amount of anti-surge valve 152 may be increased in order to decrease the amount of boosted air in intake passage 149 so that surge conditions are reduced.

The method then returns to 304 to determine if engine temperature is less than the temperature threshold. If the engine temperature is not less than the temperature threshold, e.g., if the engine temperature is greater than the temperature threshold at 304, then method 300 proceeds to 336. At 336, method 300 includes discontinuing diverting heated compressed air to the heat exchanger. For example, the second throttle 185 may be adjusted to a closed position once the engine has warmed up and has sufficient excess heat to provide heat to heat consuming vehicle and engine components. However, after the engine is warmed up, the second throttle 185 may be used to assist in control of turbocharger operation and to decrease occurrence of surge events as described below.

For example, at 338, method 300 includes determining if an increased boost request occurs. For example, an increased boost request may occur in response to an increased engine load or in response to a driver tip-in where the driver presses an accelerator pedal to request an increased amount of torque. If an increased boost request occurs at 338, then method 300 proceeds to 340 to adjust one or more wastegate valves to achieve the desired boost. For example, one or more of wastegate valves 128 and 138 may be actuated to meet the increased boost request. For example, an opening of a wastegate valve may be decreased in order to increase an amount of boosted air provided to the engine while the second throttle is maintained in the closed position.

However, if an increased boost request does not occur at 338, then method 300 proceeds to 342. At 342, method 300 includes determining if a decreased boost request occurs. For example, a decreased boost request may occur in response to a decrease in engine load or in response to a driver tip-out where the driver disengages an accelerator pedal to request a decreased amount of torque. If a decreased boost request does not occur at 342, then method proceeds to 340 to adjust one or more wastegate valves to achieve the desired boost. For example, one or more wastegate valves in the engine system may be adjusted based on desired boost changes while maintaining the second throttle in a closed position.

However, if a decreased boost request occurs at 342, then method 300 proceeds to 344. At 344, method 300 includes adjusting the wastegate to achieve the desired boost. For example, an opening amount of one or more wastegate valves in the engine system may be increased in order to decrease an amount of boosted air provided to the engine. However, if the wastegate valve is adjusted to a fully open position and the decreased boost request is still not achieved, then the second throttle may be used to assist in meeting this reduced boost request. Thus, at 346, method 300 includes determining if the desired boost is achieved. If not, then method 300 proceeds to 348 to adjust the second throttle to achieve the desired boost. For example, when the wastegate valve is fully open, the second throttle may be adjusted from a fully closed position to an open position in order to further reduce the amount of boost to meet the decreased boost request.

At 350, method 300 includes determining if a surge condition is present. As remarked above, determining if a surge condition is present may be based on one or more of pressure readings, temperature readings, and air flow readings from various sensor systems in the engine system, e.g., sensor systems 212, 210, and 208. For example, if boost pressure is determined to by above a pressure threshold and an amount of flow of boosted air is determined to be below an air flow threshold then a surge condition may be identified. As another example, identification of a surge condition may be based on a position of intake throttle 185 together with an amount of boosted air output by a compressor. For example, if the amount of boosted air is greater than a threshold and if an amount of opening of the intake throttle 158 is less than a threshold amount then a surge condition may be identified.

If a surge condition is present at 350, then method 300 proceeds to 352 to adjust the anti-surge valve to reduce surge conditions. For example, an opening of anti-surge valve 152 may be increased in order to reduce an amount of boosted air delivered to intake passage 149 in order to reduce surge conditions. At 354, method 300 includes determining if surge conditions were reduced via adjustment of the anti-surge valve. If surge conditions were reduced at 354, method 300 proceeds to 358 to adjust the wastegate to achieve the desired boost. However, if the anti-surge valve is adjusted to a fully open position and surge conditions are still present then the second throttle may be adjusted in order to reduce surge conditions. Thus, if surge conditions were not reduced at 354, then method 300 proceeds to 356 to adjust the second throttle to reduce surge conditions. For example, an opening amount of the second throttle may be increased to further reduce the amount of boosted air in intake passage 149 in order to reduce surge conditions.

Figure 4:
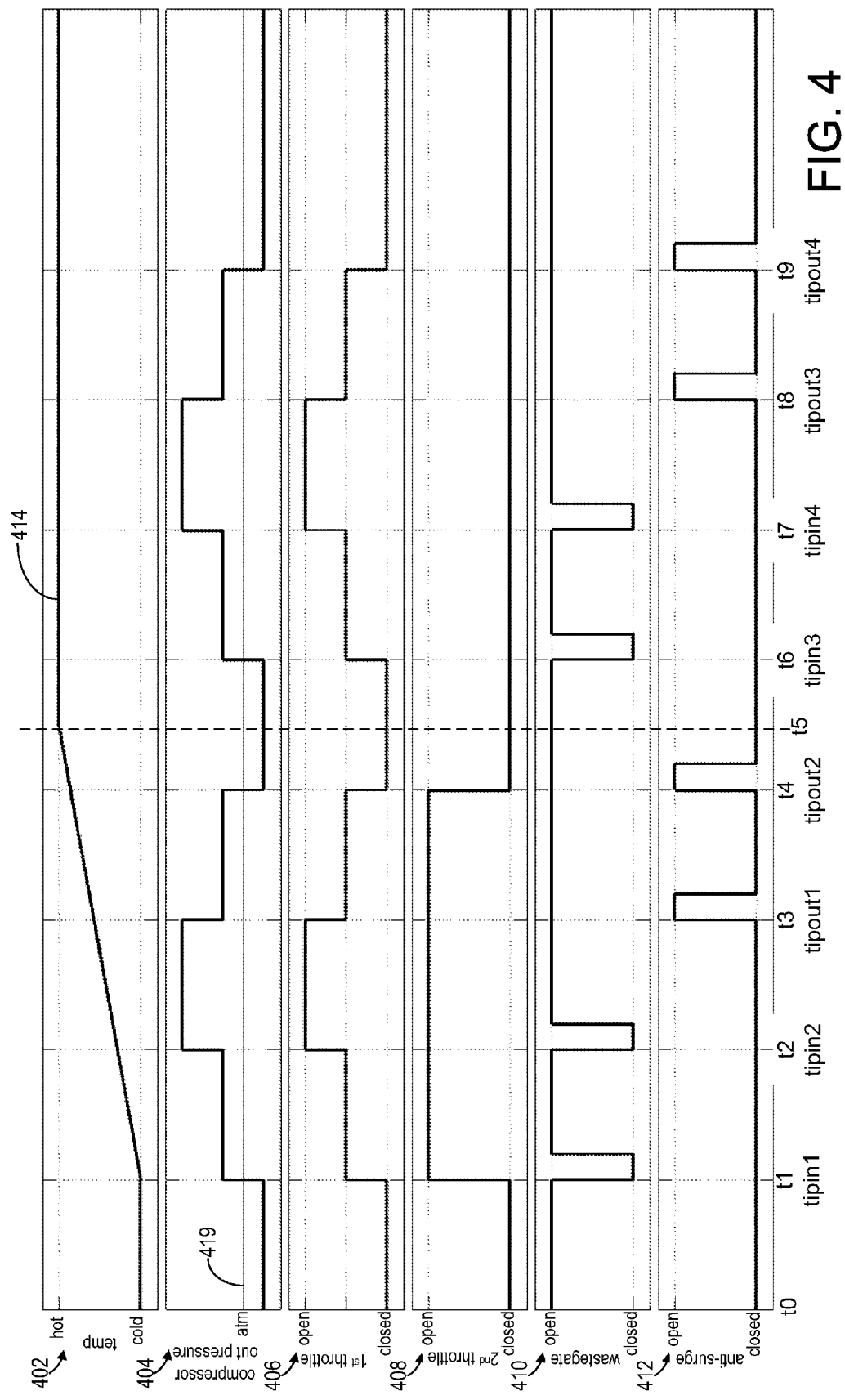
FIG. 4 shows example graphs illustrating an example control routine for an engine with a turbocharger in accordance with the disclosure.

FIG. 4 shows example graphs illustrating an example method, e.g., method 300 shown in FIG. 3, for a turbocharged engine including an additional or second throttle, e.g., second throttle 185, located in a conduit coupled between an outlet of the compressor and a cylinder intake valve in the engine. The graph at 402 shows engine temperature versus time. The graph at 404 shows compressor outlet pressure relative to atmospheric pressure 419 versus time. The graph at 406 shows the position of the main or first intake throttle 158 versus time, where the position varies from a fully open position (open) to a fully closed position (closed). The graph at 408 shows the position of the additional or second throttle 185 versus time, where the position varies from a fully open position (open) to a fully closed position (closed). The graph at 410 shows the position of a wastegate valve, e.g., wastegate valve 138 and/or wastegate valve 128, versus time, where the position varies from a fully open position (open) to a fully closed position (closed). The graph at 412 shows the position of an anti-surge valve, e.g., valve 152, versus time, where the position varies from a fully open position (open) to a fully closed position (closed).

At time t0 in FIG. 4, a cold engine start from rest occurs. Between time t0 and t1, the first intake throttle and the second throttle remain in a closed position while the wastegate valve is adjusted to the fully-open position to assist in controlling boost supplied to the engine while the engine is warming up and while the compressor out pressure is below atmospheric pressure. At time t1, a tip-in occurs so that an increased amount of boost is requested. In response, between time t1 and t2, an opening of the wastegate valve is decreased to a fully closed position for a duration to accommodate this increase in boost while the second throttle adjusted to a fully open position to provide heat to various engine and vehicle heat consuming components while the engine is warming up. During this time the first throttle is partially opened to control flow of air to the engine. The second throttle can be opened whenever the compressor out pressure is greater than atmospheric pressure (which results also in compressor out temperature greater than ambient temperature) and when there is a need for hot air to heat various engine and vehicle heat consuming components. After a duration following the tip-in at t1 after which the increased boost request is met, the wastegate is again adjusted to a fully open position.

At time t2, a second tip-in occurs so that an increase in compressor outlet pressure is desired. Thus, at time t2, the opening amount of the first throttle is further increased while the second throttle remains in a fully open position to continue providing heated air to engine and vehicle components. Further, at the second tip-in at t2, the wastegate is adjusted to a fully-closed position for a duration to accommodate the increased boost request at t2. After the increased boost request is met after time t2, the wastegate is again closed.

At time t3, a driver tip-out occurs so that a decreased amount of boost is requested. In order to accommodate this decreased boost request, an opening amount of the first throttle is decreased while the second throttle and wastegate are maintained in a fully open position to further reduce an amount of boosted air provided to the engine. In order to reduce surge conditions, the anti-surge valve is opened for a short duration during tip-outs to prevent surge, thus the anti-surge valve is adjusted to a fully open position for a duration following the tip-out at time t3. Once the reduced boost conditions are met following the tip-out at time t3, the anti-surge valve is adjusted to a closed position.

At time t4, a second tip-out occurs so that a further decrease in boost pressure is requested. In this example, the compressor out pressure decreases to below the atmospheric pressure, thus the second throttle is adjusted to a closed position at time t4. Further, an opening amount of the first throttle is further reduced while the wastegate valve is maintained in a fully open position in order to meet the decreased boost request. The anti-surge valve is again opened at time t3 for a duration in order to prevent surge.

At t5, the engine is determined to be sufficiently warmed up so that excess heat is available from the engine to heat various engine and vehicle heat consuming components. For example, at time t5, the engine temperature increases above a threshold temperature 414. Since the engine is warmed up at time t5, the second throttle is adjusted or maintained in a closed position at time t5.

At time t6, a tip-in occurs to generate an increased boost request. Thus, at time t6, an opening of the wastegate valve is decreased to provide an increased amount of boosted air to the engine while the second throttle is maintained in the closed position and an opening of the first throttle is increased to control air flow to the engine.

A tip-out occurs at time t8 to generate a decreased boost request, thus at time t8 an opening of the wastegate valve is increased or maintained at a fully open position and the anti-surge valve is opened for a duration to prevent surge following the tip-out. At time t9, another tip-out occurs so that a further decrease in boost pressure is requested. Thus, at time t9 the wastegate is maintained open and the anti-surge valve is again opened for a duration to prevent surge.

Note that the example process flows included herein can be used with various valve systems, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
    during a cold start condition of a turbocharged engine,
        diverting a portion of compressed air from downstream a compressor to a heat exchanger;
        heating vehicle components via the heat exchanger; and
        directing a remainder portion of compressed air from downstream the compressor to a cylinder intake valve in the turbocharged engine; and
    in response to a surge condition during the cold start condition,
        opening a throttle in a conduit coupled to an intake of the turbocharged engine between an outlet of the compressor and the cylinder intake valve to a fully open position to divert the portion of compressed air from downstream the compressor to the heat exchanger and opening an anti-surge valve located in a conduit between an inlet of the compressor and the outlet of the compressor.

2. The method of claim 1, wherein the cold start condition includes an engine temperature less than a threshold temperature and only in response to a request for cabin heat by an operator, and diverting the portion of compressed air from downstream the compressor to the heat exchanger comprises opening the throttle located in the conduit coupled between the outlet of the compressor and the cylinder intake valve in the engine by a first amount and the method further comprises, during the cold start condition, in response to an increased boost request, opening the throttle by a second amount less than the first amount and opening a wastegate valve located in a conduit coupled between an outlet of a turbine and a cylinder exhaust valve.

3. The method of claim 1, wherein the cold start condition includes an engine temperature less than a threshold temperature and diverting the portion of compressed air from downstream the compressor to the heat exchanger comprises opening the throttle located in the conduit coupled between the outlet of the compressor and the cylinder intake valve in the engine and the method further comprises, during the cold start condition, in response to a decreased boost request, opening the throttle to a fully open position and opening a wastegate valve located in a conduit coupled between an outlet of a turbine and a cylinder exhaust valve.

4. The method of claim 1, wherein the turbocharged engine includes a turbine located in an exhaust passage, the compressor located in an intake passage, the turbine coupled to the compressor via a shaft.

5. The method of claim 1, wherein the cold start condition includes an engine temperature less than a threshold temperature and the method further comprises closing the throttle positioned in the conduit coupled between the outlet of the compressor and the cylinder intake valve in the engine to discontinue diverting the portion of compressed air from downstream the compressor to the heat exchanger in response to the engine temperature greater than the threshold temperature.

6. The method of claim 5, further comprising, in response to an increased boost request when the engine temperature is greater than the threshold temperature, actuating a wastegate valve located in a conduit coupled between an outlet of a turbine and a cylinder exhaust valve while maintaining the throttle in a closed position.

7. The method of claim 5, further comprising, in response to a decreased boost request when the engine temperature is greater than the threshold temperature, opening a wastegate valve located in a conduit coupled between an outlet of a turbine and a cylinder exhaust valve and opening the throttle.

8. The method of claim 5, further comprising, in response to the surge condition when the engine temperature is greater than the threshold temperature, opening the anti-surge valve located in a conduit between an inlet of the compressor and the outlet of the compressor and opening the throttle.

9. A method for a vehicle, comprising:
during a cold start condition of a turbocharged engine,
diverting a portion of compressed air from downstream a compressor to a heat exchanger; and
heating vehicle components via the heat exchanger, wherein diverting the portion of compressed air from downstream the compressor to the heat exchanger comprises actuating a throttle located in a conduit coupled between an outlet of a compressor and a cylinder intake valve in the engine, wherein a first throttle is positioned in an intake of the engine downstream of the outlet of the compressor and diverting the portion of compressed air from downstream the compressor to the heat exchanger comprises actuating a second throttle located in a conduit coupled between the outlet of the compressor and the first throttle.

10. A system for a vehicle with an engine, comprising:
a turbocharger including a compressor;
a first throttle located in an intake of the engine between an outlet of the compressor and an intake valve of a cylinder of the engine;
a second throttle located in a conduit between the outlet of the compressor and the first throttle;
a compressor bypass conduit coupled to the intake of the engine at a position upstream of an inlet of the compressor and at a position downstream of the outlet of the compressor;
an anti-surge valve located in the compressor bypass conduit; and
a controller configured to:
in response to an engine temperature less than a threshold temperature,
open the second throttle to divert a portion of compressed air from downstream the compressor to a heat exchanger; and
adjust the first throttle based on engine operating conditions;
in response to a surge condition when the engine temperature is greater than the threshold temperature,
open the anti-surge valve; and
in response to surge conditions continuing after the opening of the anti-surge valve,
open the second throttle to divert the portion of compressed air from downstream the compressor to the heat exchanger.

11. The system of claim 10, wherein the controller is further configured to, in response to the engine temperature greater than the threshold temperature, close the second throttle to discontinue diverting the portion of compressed air from downstream the compressor to the heat exchanger and adjust the first throttle based on engine operating conditions.

* * * * *